Sept. 26, 1961    J. A. URBAN ET AL    3,001,451
TRANSITORY EXHAUST DEFLECTOR
Filed Jan. 28, 1959
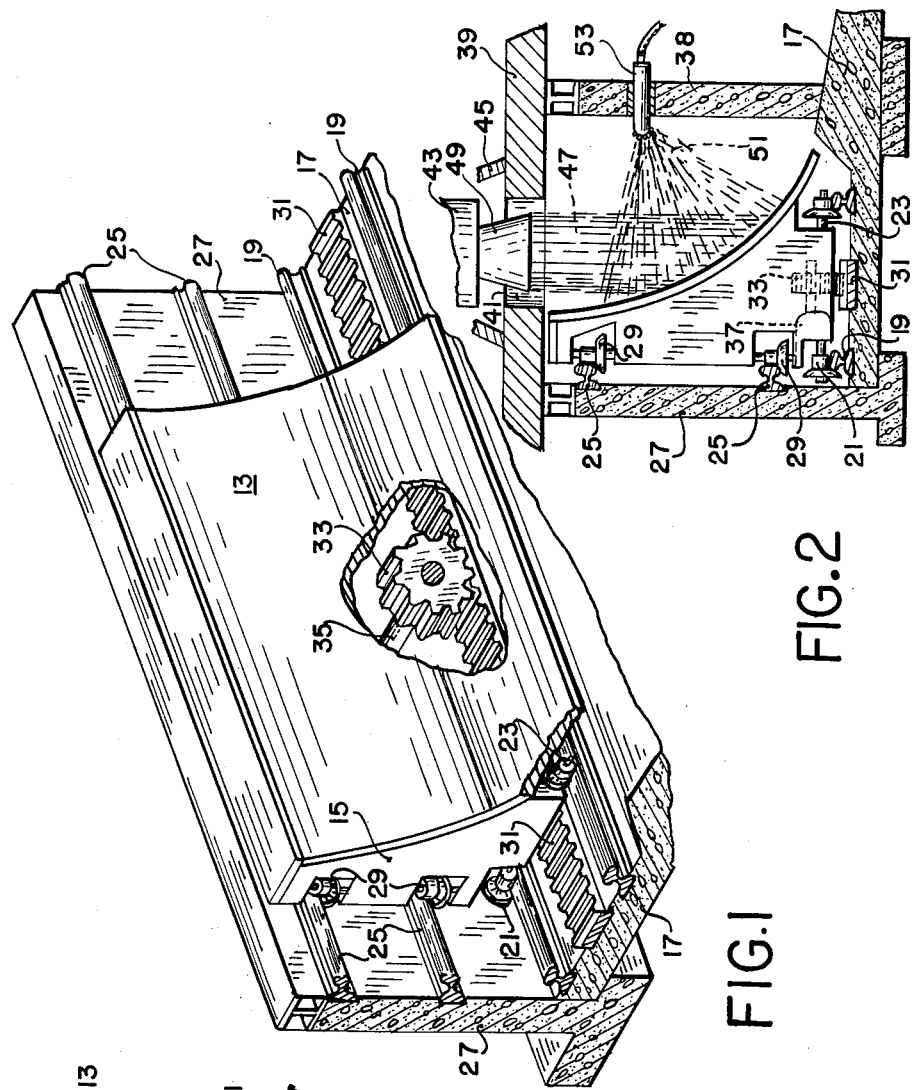
INVENTORS.
JOHN A. URBAN &
RICHARD C. RANDALL
BY
ATTORNEYS.

United States Patent Office

3,001,451
Patented Sept. 26, 1961

3,001,451
TRANSITORY EXHAUST DEFLECTOR
John A. Urban, San Pedro, and Richard C. Randall, Torrance, Calif., assignors to the United States of America as represented by the Secretary of the Air Force
Filed Jan. 28, 1959, Ser. No. 789,756
4 Claims. (Cl. 89—1.7)
(Granted under Title 35, U.S. Code (1952), sec. 266)

The invention described herein may be manufactured and used by or for the United States Government for governmental purposes without payment to us of any royalty thereon.

This invention relates to a flame deflector for use with rocket engines during static testings and run-ins prior to launching. More particularly, the invention is concerned with providing a surface from which the exhaust blast of a rocket engine may be deflected without causing hotspots or requiring large amounts of cooling water to prevent destruction of the surface of the deflector.

During engine testing and prior to launching, some structure must be employed to support the rocket engined aircraft in the proper attitude. Such a device is known as a "launcher." Basically, it is a mechanical structure which supports and constrains the rocket so that it leaves the ground in the proper direction and follows the initial flight pattern. Of all the various types of launchers used, the platform and tower launchers are most commonly used for large, high-altitude research rockets and spacecraft. To prevent violent erosion of the area beneath the launcher caused by the concentrated exhaust stream, a pyramid shaped blast deflector plate is commonly placed at the base of the platform. Large amounts of water are poured over and around the deflector during the time that the rocket engine is operating in order to prevent destruction of the deflector plate and consequent erosion of the surrounding area. The present invention eliminates the necessity of having large quantities of water available at launching sites and piping and plumbing which accompany the transfer of water from its source to the deflection plate.

Accordingly, an important object of the present invention is to provide an improved means for deflecting the blast from the exhaust nozzle of a rocket engine by including a movable surface upon which the exhaust flame impinges.

Another object of the invention is to provide a rocket engine exhaust deflector which is constructed from a series of elongated parallel members each of which is independently replaceable if necessary.

Still another object of the invention is to provide an exhaust deflector which is laterally movable and offers a greater surface area from which the intense heat generated by the rocket engine may be dissipated.

A still further object of the invention is to provide an exhaust deflector which eliminates the necessity of providing unusually large amounts of water to deluge the deflector. A relatively small amount of water may be helpful for quenching the deflector described herein at some point of its lateral movement during prolonged runs of 20 to 25 seconds.

These and other objects, features and advantages including safety features and construction benefits will become more apparent when considered in connection with the following drawings showing typical preferred embodiments wherein:

FIG. 1 is a view in perspective of the laterally movable transitory deflector with the rocket holding platform removed;

FIG. 2 is a view in cross-section of the deflector showing the platform with a fragmentary view of the rocket mounted in position for launching; and FIG. 3 is a side view of one embodiment of the deflector showing a construction which provides for a sectionally replaceable working surface.

Referring now to FIG. 1 there is shown a view in perspective of the deflector 13. The main portion of the deflector 13 may comprise a series of elongated parallel members which when assembled, take the form of an elongated, concave-surfaced member which is capable of lateral motion in a direction perpendicular to the jet impingement. A series of support members 15 are inserted under said concave deflector and serve to support and form the elongated members into the desired concave configuration. The deflector member would normally be mounted on a fixed concrete base 17. A pair of rails 19 are attached to the concrete base 17 and engage a series of wheels 21 which turn on the axle shaft 23 fixed to the lower part of the deflector members 13. Another pair of rails 25 are attached to the side of an upright member 27. A series of wheels 29 engage these side rails 25 and serve to permit lateral movement of the deflector.

A rack 31 engaging with the pinion 33 serves as the drive means for applying the lateral motion to the deflector. The pinion shaft 35 is attached to a drive motor 37 (shown in FIG. 3). The drive motor and pinion would, of course, be fixed to some part of the deflector 13, and would travel back and forth therewith and cause lateral motion of the deflector.

A cross-sectional view of the exhaust deflector is shown in FIG. 2. It will be noted that a second upright member 38 cooperates with the member 27 to support the platform 39. An opening 41 is provided in the platform 39. The missile 43 is mounted on a missile stand or launcher 45 so that the exhaust blast 47 issuing from the nozzle 49 passes through the opening 41 and impinges on the deflector 13.

Under certain conditions, particularly during prolonged runs of 20 to 25 seconds, additional cooling may be required. If necessary, small streams of water 51 can be sprayed from nozzles 53 thereby adding to the cooling capacity of the deflector. The nozzles 53 would be placed so that the stream of water would strike the deflector at either side of the point where the exhaust blast 47 impinges. Thus the deflector would be cooled as it passed in either direction through the streams of water.

In FIG. 3 there is shown a sectional view of the blast deflector. As shown in this view, the main blast receiving concave portion of the deflector is made up of a series of elongated parallel members. It can be easily seen that if one or more of these members needs replacement, it is a relatively simple operation to restore the deflector to its original condition by replacing the burnt members with other new or reconditioned members.

It may be desirable under certain circumstances to cause lateral movement of the deflector by a system other than that shown in the drawings. Alternative drive means such as belt and pulley arrangements may be used to move the elongated impingement surfaced deflector along the track. The deflector might be motivated at a speed consistent with the burning time and the perpendicular distance from the nozzle to the impingement surface so that no portion of the deflector surface is subjected to the hot exhaust gases for a period of time which would cause damage to the deflector member 13.

Quenching of the deflector member 13 could be accomplished, if necessary, by small streams of water arranged to contact the deflector surface after the rocket blast has impinged thereon. To further reduce the size of the deflector, the design of the mechanism to motivate the movable deflector has incorporated the capability for reversible transitory lateral motion.

It has been determined that the critical time period when operating on the presently known dry deflectors is encountered within 2-4 seconds after the start of the blast period. Using the transitory deflector described herein prolonged runs lasting 5 to 10 times longer may be accomplished without the danger of hot-spots and burn-out.

In the most useful application of the rocket blast deflector shown in the drawings and described in the foregoing matter, the rocket is of the type which is normally launched from a platform or tower launcher so that it would point substantially vertically upward. This would mean that the blast would extend in a directly opposite direction or downward. The problem, of course, is to deflect the blast so that the intense heat will not destroy the area in the path of the rocket blast. In doing so, something must be put in this path and the present invention provides that a laterally movable member be placed in such a position that the blast impinges on the moving member rather than on a fixed stationary surface. This prevents the violent erosion that would result from normal blast discharge of the rocket.

As the deflector 13 driven by the rack and pinion 31 and 33, respectively attached to the base 17 and the deflector 13, moves laterally, the blast 47 from the missile 43 impinges thereon. However, the lateral movement of the deflector 13 eliminates the formation of hot-spots and consequent necessity of large quantities of deluge water. Also, constant movement at optimum speeds allows for a certain amount of air cooling of the deflector, and if additional cooling is required, this is accomplished as explained above by quenching the deflector at certain points of its movement.

Having described only a typical form of the invention, it will be understood to those skilled in the art that various changes and modifications may be made therein without departing from the true spirit and scope of the invention.

What we claim is:

1. An exhaust deflector for deflecting the blast issuing from the exhaust nozzle of a rocket comprising, a base portion, a plurality of upright members supported by said base portion and extending upwardly therefrom, a platform having at least one opening therein held in spaced relation to said base portion by said upright members, a rocket disposed over the opening in said platform so that its exhaust blast issues through said opening, an elongated laterally movable concave surfaced deflector member disposed between said base and said platform, said deflector member being placed so that the blast issuing from said rocket and passing through said opening impinges on the concave surface of said deflector member, a plurality of tracks, a series of wheels mounted on said deflector member and engaging said tracks for guiding said deflector in a lateral direction, and means for transmitting lateral transitory motion to said deflector.

2. The exhaust deflector defined in claim 1 wherein the means for transmitting lateral transitory motion to said deflector member includes a rack mounted along said base portion, and a pinion gear mounted on one end of a driven shaft, said rack and pinion gear being in mesh with each other, the rotary motion of said driven shaft being translated to rectilinear motion through said rack and pinion.

3. An exhaust deflector for deflecting the blast issuing from the exhaust nozzle of a rocket comprising a base portion, a plurality of upright members supported by said base portion and extending upwardly therefrom, a platform having at least one opening therein held in spaced relation to said base portion by said upright members, a rocket disposed over the opening in said platform so that its exhaust blast issues through said opening, an elongated laterally movable concave surfaced deflector member disposed between said base and said platform, said deflector member comprising a plurality of individually replaceable elongated members of varying thickness from one edge to the other, said elongated members being arranged so that the thinner edge of one member is covered by the thicker edge of the adjacent member, and a series of shaped support members serving as inner ribs to hold said elongated members in place to form the concave deflector member, the blast issuing from said rocket and passing through said opening impinging on the outer surface of said parallel members forming the deflector member, a plurality of tracks, a series of wheels mounted on said deflector member and engaging said tracks for guiding said deflector in a lateral direction, and means for transmitting lateral transitory motion to said deflector.

4. The exhaust deflector defined in claim 3 wherein the means for transmitting lateral transitory motion to said deflector member includes a rack mounted along said base portion, and a pinion gear mounted on one end of a driven shaft, said rack and pinion gear being in mesh with each other, the rotary motion of said driven shaft and pinion gear being translated to rectilinear motion through said rack and pinion.

References Cited in the file of this patent
UNITED STATES PATENTS

| | | |
|---|---|---|
| 1,548,158 | Murray | Aug. 4, 1925 |
| 2,498,995 | Manning | Feb. 20, 1950 |
| 2,826,382 | Hayden | Mar. 11, 1958 |
| 2,925,013 | Santora et al. | Feb. 16, 1960 |